United States Patent
Jay et al.

(10) Patent No.: US 7,682,115 B1
(45) Date of Patent: Mar. 23, 2010

(54) RECONFIGURABLE LOAD-BINDING SYSTEM AND APPARATUS

(76) Inventors: Ron Jay, 411 E. 2nd, P.O. Box 357, Paxton, NE (US) 69155; Travis Jay, 309 E. 3rd, Paxton, NE (US) 69155

(*) Notice: Subject to any disclaimer, the term of this patent is extended or adjusted under 35 U.S.C. 154(b) by 400 days.

(21) Appl. No.: 11/406,059

(22) Filed: Apr. 18, 2006

Related U.S. Application Data

(60) Provisional application No. 60/672,400, filed on Apr. 18, 2005.

(51) Int. Cl.
*B61D 45/00* (2006.01)

(52) U.S. Cl. .................................................. 410/101
(58) Field of Classification Search ................ 410/101, 410/97, 3–4, 7–8, 19, 77, 52, 56, 58, 78, 410/84–85, 98, 102
See application file for complete search history.

(56) References Cited

U.S. PATENT DOCUMENTS

| | | | | |
|---|---|---|---|---|
| 2,492,829 A | * | 12/1949 | Baker | 410/28.1 |
| 4,027,892 A | * | 6/1977 | Parks | 410/3 |
| 4,925,226 A | * | 5/1990 | Leonard et al. | 294/82.1 |
| 5,378,094 A | * | 1/1995 | Martin et al. | 410/112 |
| 5,609,452 A | * | 3/1997 | Looker et al. | 410/105 |
| 5,674,033 A | * | 10/1997 | Ruegg | 410/104 |
| 5,733,082 A | * | 3/1998 | Schrader | 410/115 |
| 5,738,471 A | * | 4/1998 | Zentner et al. | 410/110 |
| 6,260,813 B1 | * | 7/2001 | Whitcomb | 248/503.1 |
| 6,769,847 B1 | * | 8/2004 | Heilmann | 410/104 |
| 7,137,764 B2 | * | 11/2006 | Johnson | 410/101 |

* cited by examiner

*Primary Examiner*—Hilary Gutman
(74) *Attorney, Agent, or Firm*—Suiter Swantz pc llo

(57) ABSTRACT

A load binding apparatus for mounting an object comprising a frame assembly suitable for supporting at least one object, at least one channel coupled to the underside of the frame assembly, the channel further comprising at least one receiving aperture, and a securing assembly for releasably coupling an attachment to the frame assembly through the receiving aperture.

15 Claims, 10 Drawing Sheets

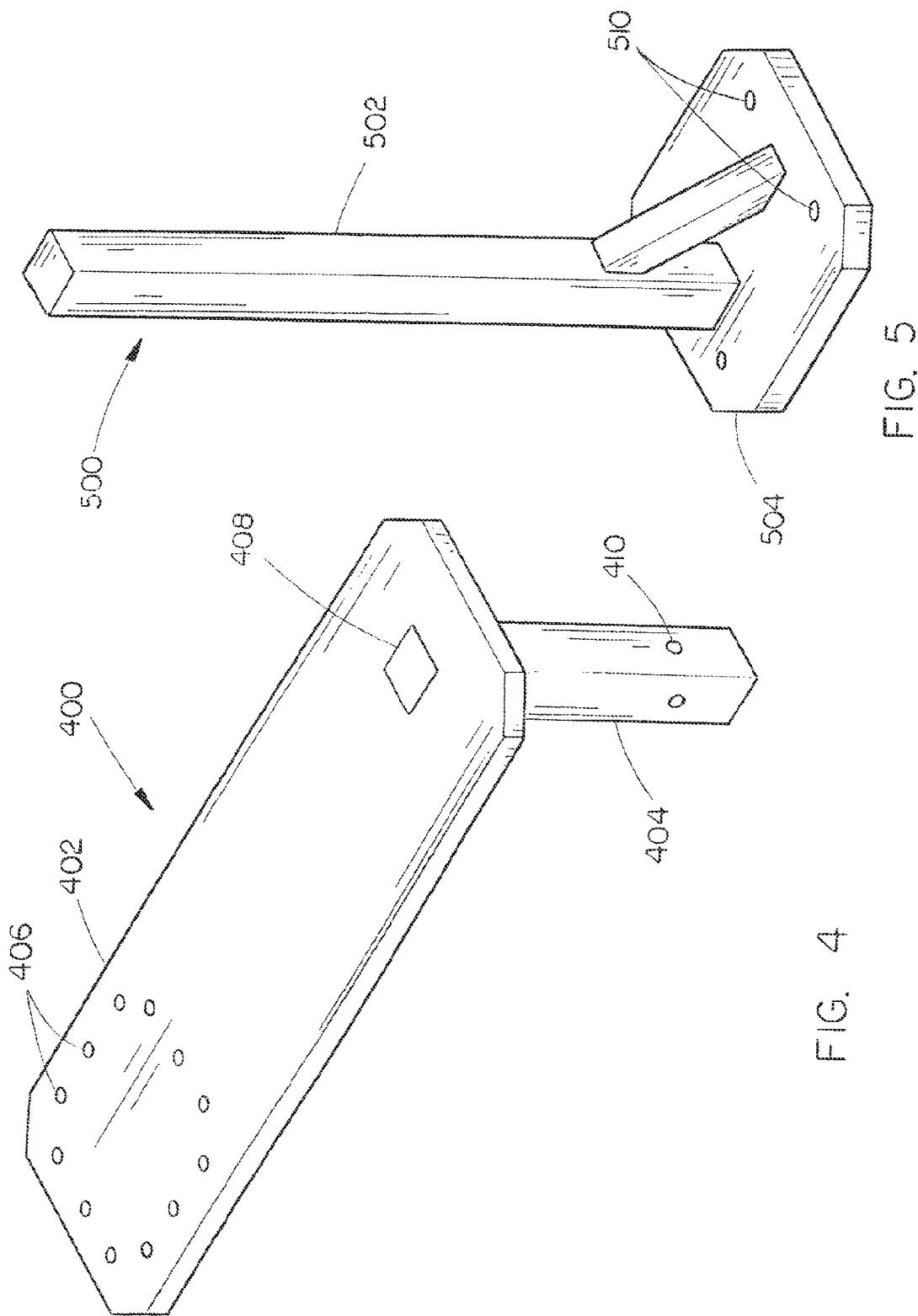

RECONFIGURABLE LOAD-BINDING SYSTEM AND APPARATUS

CROSS REFERENCE TO RELATED APPLICATIONS

The present application claims the benefit under 35 U.S.C. § 119 of U.S. Provisional Application Ser. No. 60/672,400 filed Apr. 18, 2005. Said U.S. Provisional Application Ser. No. 60/672,400 filed Apr. 18, 2005 is hereby incorporated by reference in its entirety.

FIELD OF THE INVENTION

The present invention generally relates to the field of trailers, and more particularly to a reconfigurable load binding apparatus providing attachment points for interchangeable attachments.

BACKGROUND OF THE INVENTION

Trailers are utilized for various personal and commercial purposes, ranging from hauling goods for delivery to transporting automobiles, watercraft, snowcraft or aircraft to a desired destination for use, sale, repair and the like. Often, a trailer may only be able to transport one specific type of product. For instance, a boat trailer may generally only tow a boat; a jet ski trailer may only be suitable for towing one or more jet skis, and so on. This may require having multiple trailers to tow multiple objects to a desired destination, which may be inconvenient if a user would prefer to tow different types of watercraft, or different types of towable objects, such as a snowmobile and an automobile, or a boat and one or more jet skis.

An additional concern when loading and unloading trailers and other towing devices is ensuring that an towed object is securely mounted onto a trailer bed, ramp or other surface prior to transport. While there exist in the art load-securing systems, many such systems may be bulky, complicated and cost-prohibitively expensive.

Consequently, it would be advantageous if a system and apparatus existed which provided secure, efficient load-binding.

SUMMARY OF THE INVENTION

Accordingly, the present invention is directed to an apparatus and system for providing reconfigurable load-binding. In a first aspect of the invention, a reconfigurable load binding apparatus is considered. Load binding apparatus may be comprised of a frame assembly having a plurality of receiving apertures disposed on the surface of the frame assembly and at least one load binding apparatus attachment suitable for insertion into one of the plurality of receiving apertures. Load binding apparatus may be further comprised of a securing assembly suitable for securing and releasing at least one load binding apparatus attachment from a receiving aperture.

In a second aspect of the invention, a system for providing reconfigurable load binding is considered. System may be comprised of a frame assembly having a plurality of receiving apertures disposed on the surface of the frame assembly and at least one load binding apparatus attachment suitable for insertion into one of the plurality of receiving apertures. Load binding apparatus may be further comprised of a securing mechanism suitable for securing and releasing at least one load binding apparatus attachment from a receiving aperture.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 4 is an isometric view of a plate for connecting accessories to a load binding apparatus in accordance with an exemplary embodiment of the present invention;

FIG. 5 is an isometric view of a boat bumper for a load binding apparatus in accordance with an exemplary embodiment of the present invention;

DETAILED DESCRIPTION OF THE INVENTION

Reference will now be made in detail to the presently preferred embodiments of the invention, examples of which are illustrated in the accompanying drawings.

Figure 1:
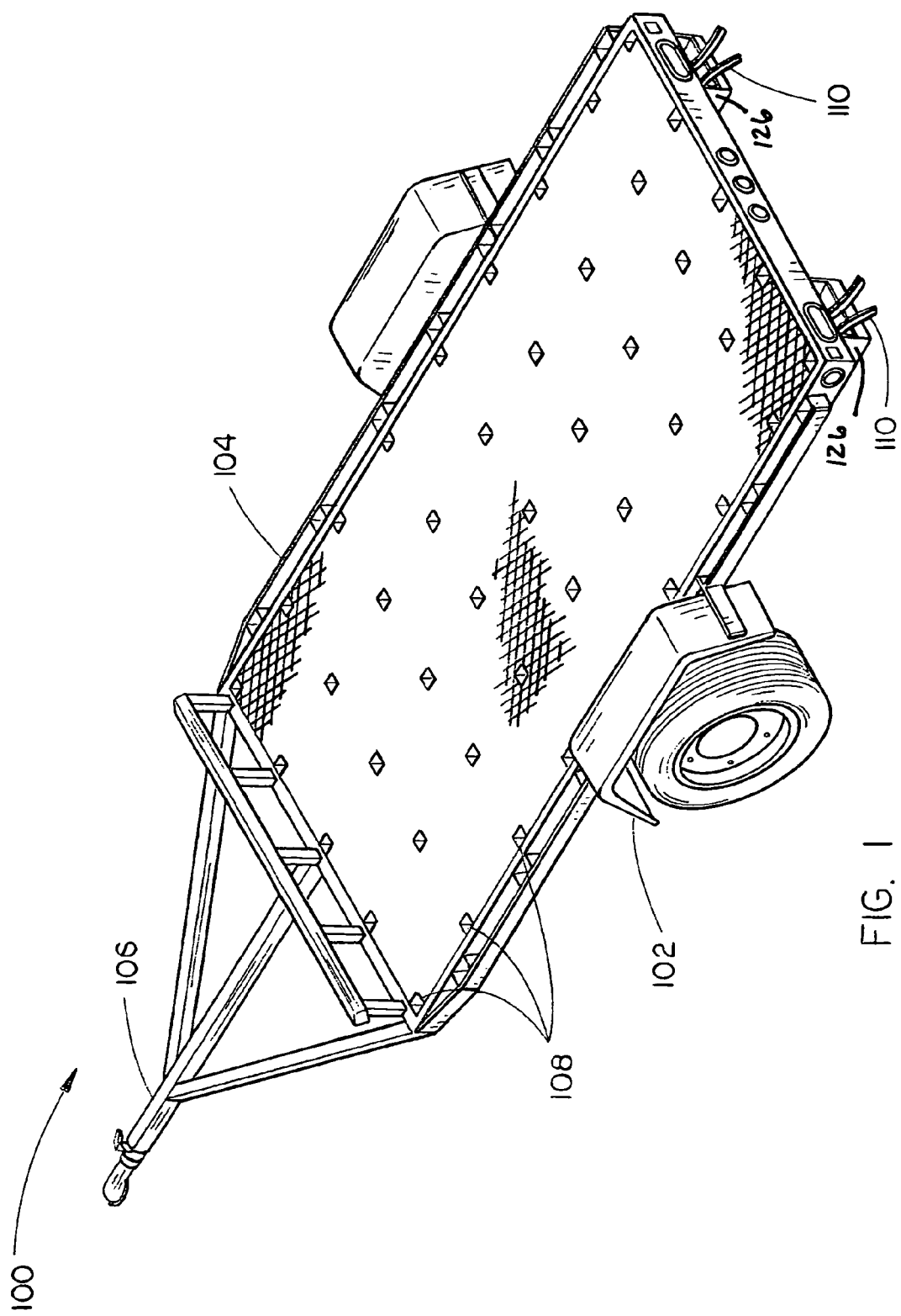
FIG. 1 is an isometric view of a load binding apparatus in accordance with an exemplary embodiment of the present invention.

Referring to FIG. 1, an isometric view of a load binding apparatus 100 in accordance with an exemplary embodiment of the present invention implemented with as load binding apparatus is shown. Load binding apparatus may include a wheel axle frame 102 supporting at least one wheel axle provided with wheels, the wheel axle frame and a rigid supporting frame assembly 104 coupled to the wheel axle frame. Wheel axle frame 102 may further comprise wheel well inserts suitable for allowing low ground clearance objects efficient loading. The rigid supporting frame assembly 104 may further comprise at least one towing hook coupling 106 arranged for cooperation with a towing hook, a plurality of receiving apertures 108 suitable for receiving at least one load binding apparatus attachment and a securing assembly suitable for securing and releasing a load binding apparatus attachment to or from the frame assembly 104.

Figure 2:
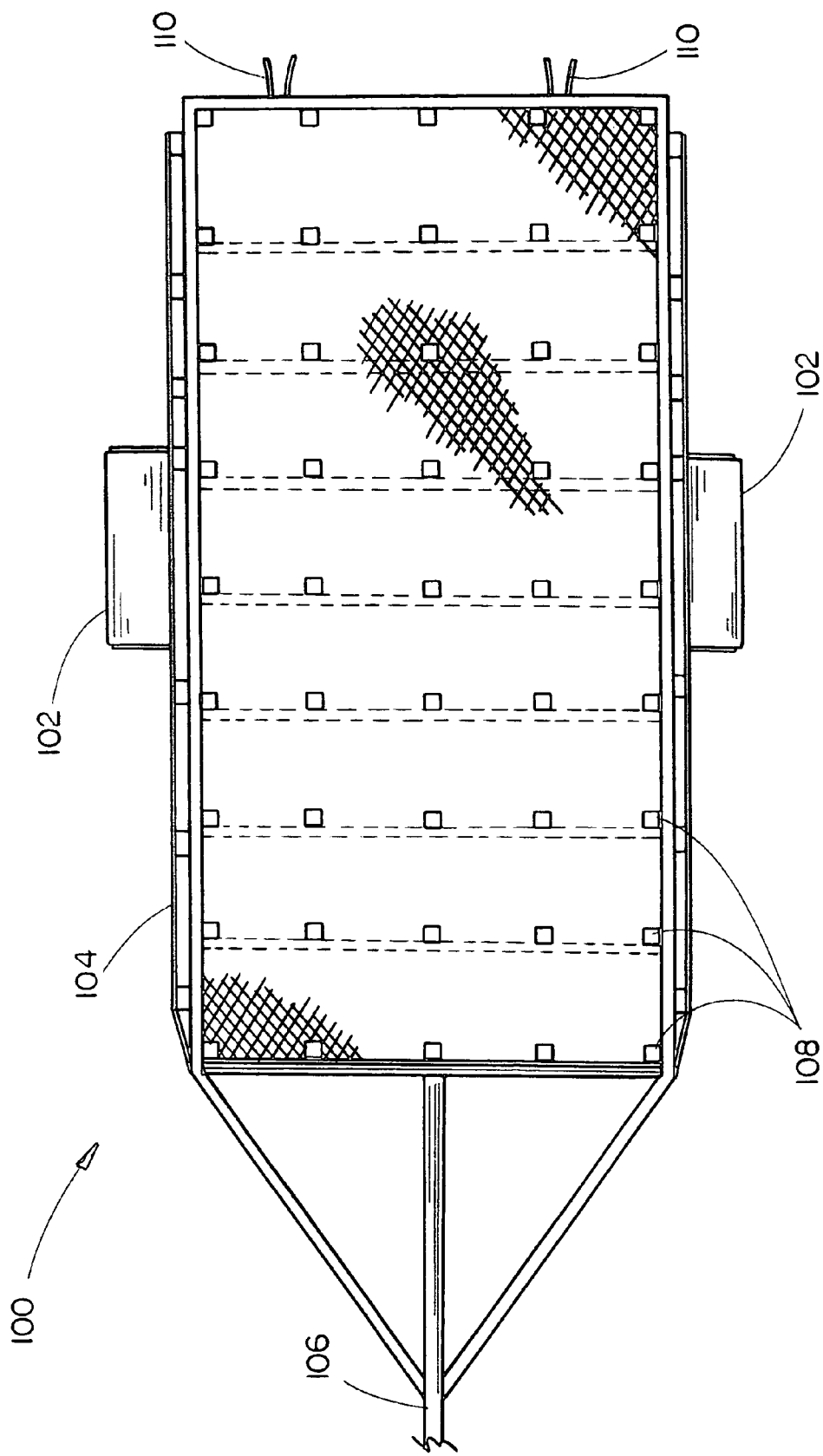
FIG. 2 is a top plan view of a load binding apparatus having a plurality of receivers configured for receiving interchangeable attachments in accordance with an exemplary embodiment of the present invention.

Referring to FIG. 2, a plan view of a load binding apparatus 100 having a plurality of receiving apertures disposed on the surface of the load binding apparatus frame assembly. The load binding apparatus support frame assembly 104 may include a plurality of receiving apertures 108 configured for receiving interchangeable attachments and fixtures. For example, in one embodiment, the load binding apparatus frame assembly receiving apertures 108 may be fitted with a fixture for supporting a personal watercraft. In one embodiment, load binding apparatus 100 may include at least 45 receiving apertures 108 to accommodate a variety of load binding attachments. Receiving apertures may be substantially similar in dimension. This may be advantageous if a user desires interchangeable attachment configuration on the surface of the load binding apparatus frame assembly. Alternatively, an individual receiving aperture may be unique in dimension with respect to other receiving apertures disposed on the frame assembly surface. This may allow for custom attachments to be secured on the frame assembly in specific desired locations.

While the exemplary embodiment of the load binding apparatus illustrated in FIGS. 1 and 2 includes a support frame assembly coupled with a wheel frame assembly including an axle having two wheels, it should be appreciated that in other embodiments, the load binding apparatus may include an axle having more than two wheels, a tandem axle load binding apparatus, a load binding apparatus having more than one deck, such as a double deck towing apparatus, or the like. A tandem axle trailer may refer to a trailer having two rear axles installed on the truck. In one embodiment, a tandem axle may include 2 or more axles some distance apart, such as at least 4 feet and not more than 8 feet apart, as measured from axle center to axle center of the extreme axles. It is further contemplated that 2 or more axles may be any distance apart suitable for providing tandem trailing. Additionally, while the load binding system and apparatus described herein implemented with a towing or trailing apparatus, it should be noted that the present invention may be suitable for implementation with any system where securing mounting of items is desired.

The load binding apparatus 100 may include a frame assembly 104 having a plurality of receiving apertures 108 configured for receiving interchangeable attachments and fixtures. For example, in one embodiment, the load binding apparatus receiving apertures 108 may be fitted with a fixture for supporting a personal watercraft. It is contemplated that a receiving aperture 108 may be substantially rectangular. It is further contemplated that one or more receiving apertures 108 may be formed within a channel 126 suitable for coupling with the underside 128 of the frame assembly 104. Frame assembly 104 may then include cut-outs located substantially above receiving apertures 108 to provide access to a receiving aperture. For example, a channel having 126 a plurality of receiving apertures 108 may be coupled crosswise to the underside 128 of the frame assembly 104, which may include a grid of cut-outs suitable for lining up with receiving apertures disposed along a channel 126. In one embodiment, one or more channels may be coupled to run from one lateral edge of the frame assembly 104 to the other lateral edge.

Load binding apparatus 100 may be comprised of a securing assembly for securing at least one attachment to the load binding apparatus. Securing assembly may provide secure coupling between the load binding apparatus 100 and a load binding apparatus attachment, such as a bumper, winch support plate, bunk, or any other load binding apparatus attachment configured to be implemented with the load binding apparatus 100 by engaging or disengaging with at least one portion of an attachment or fixture. In exemplary embodiments, the load binding apparatus securing assembly may be configured to include at least one lever assembly 110 for securing and releasing interchangeable attachments and fixtures from the plurality of receiving apertures disposed on the surface of the frame assembly. It is contemplated that securing assembly may be located substantially on the underside 128 of the frame assembly 104. Lever assembly 110 may be substantially comprised of a plurality of securing rods 302 that may include a plurality of securing pins 304. Pins 304 may be configured to engage or disengage with apertures 306 located on an attachment insert column 308. In an alternative embodiment, securing rods 302 may provide adequate tension to secure an attachment insert column 308 between at least two of the securing rods. Lever assembly 110 components may be contained in a housing to provide additional protection for securing assembly components by preventing or substantially reducing exposure of components to severe weather. In an exemplary embodiment, one or more lever assemblies 110 may include at least one handle protruding substantially from the rear of the load binding apparatus. Lever assembly handle may provide adequate torque to engage or disengage securing assembly components and attachment components.

In the embodiment described, a first lever assembly 110 may release interchangeable attachments or fixtures from a row of receiving apertures that may be in-line with the first lever assembly. A second lever assembly 110 may release interchangeable attachments or fixtures from a row of receiving apertures that may be in-line with the second lever assembly 110. It is contemplated, however, that the load binding apparatus 100 may include any desired number of lever assemblies 110 in accordance with the user specifications, manufacturer specifications, feasibility dependent upon the dimensions of the load binding apparatus, or other such specifications. In an alternative embodiment, each receiver may include a lever assembly 110 for releasing an interchangeable attachment or fixture inserted into the receiver. In additional alternative embodiments, securing assembly may be mechanized and may not require manual contraction of a lever assembly handle to release a load binding apparatus attachment.

Figure 10:
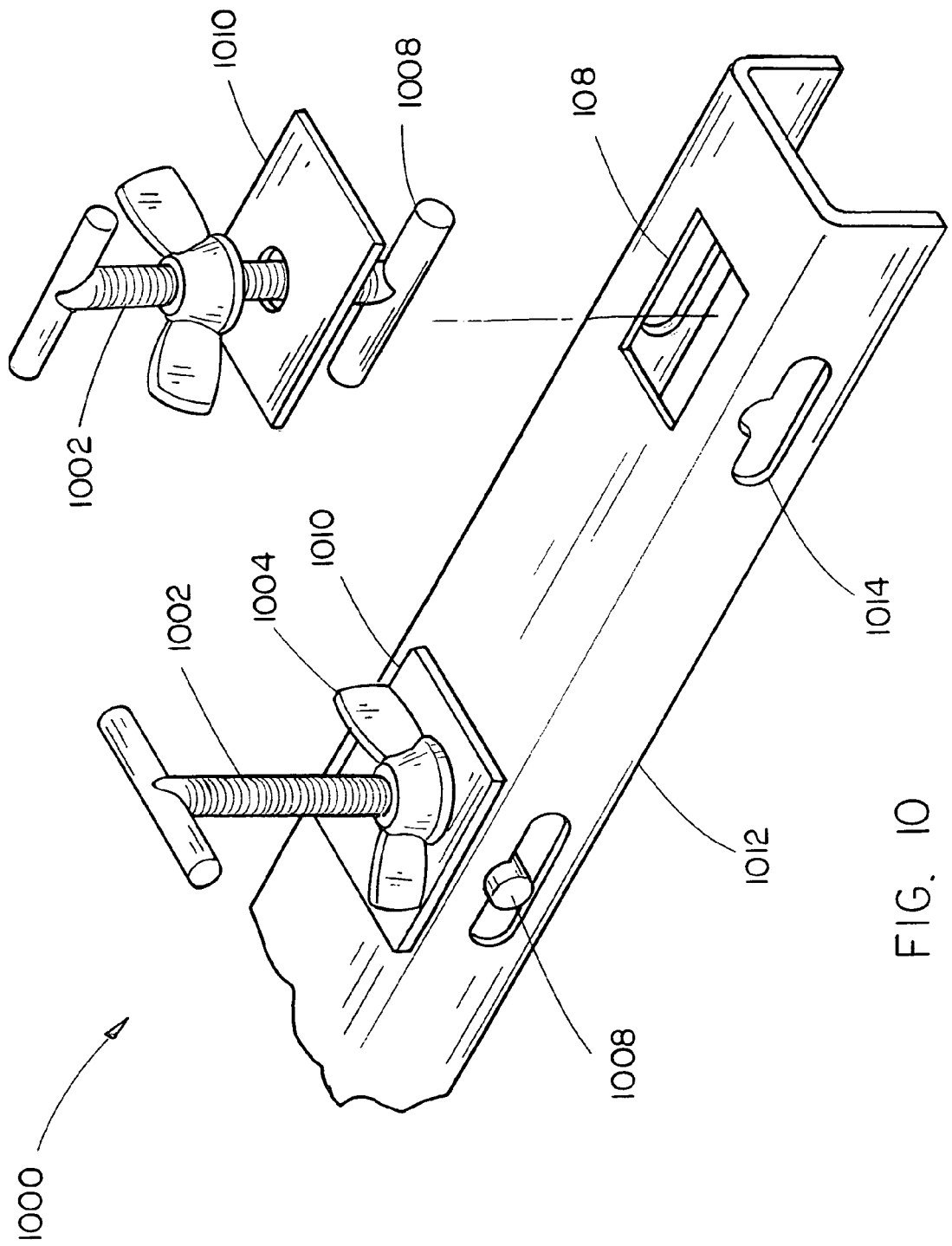
FIG. 10 is an isometric view of an exemplary securing assembly implemented with a load binding apparatus according to the present invention.
Figure 11:
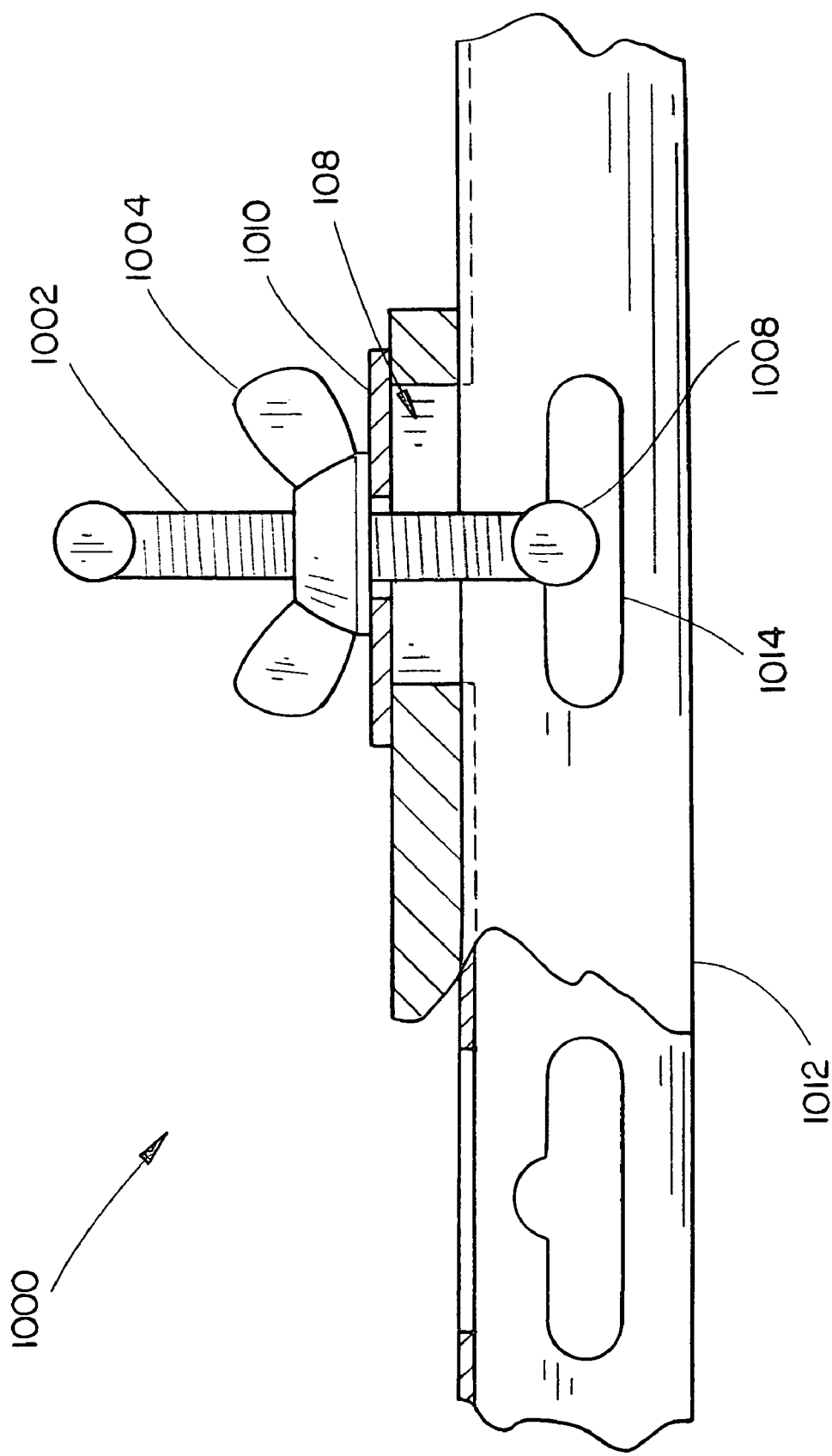
FIG. 11 is an exploded view of the exemplary securing assembly illustrated in FIG. 10.
Figure 12:
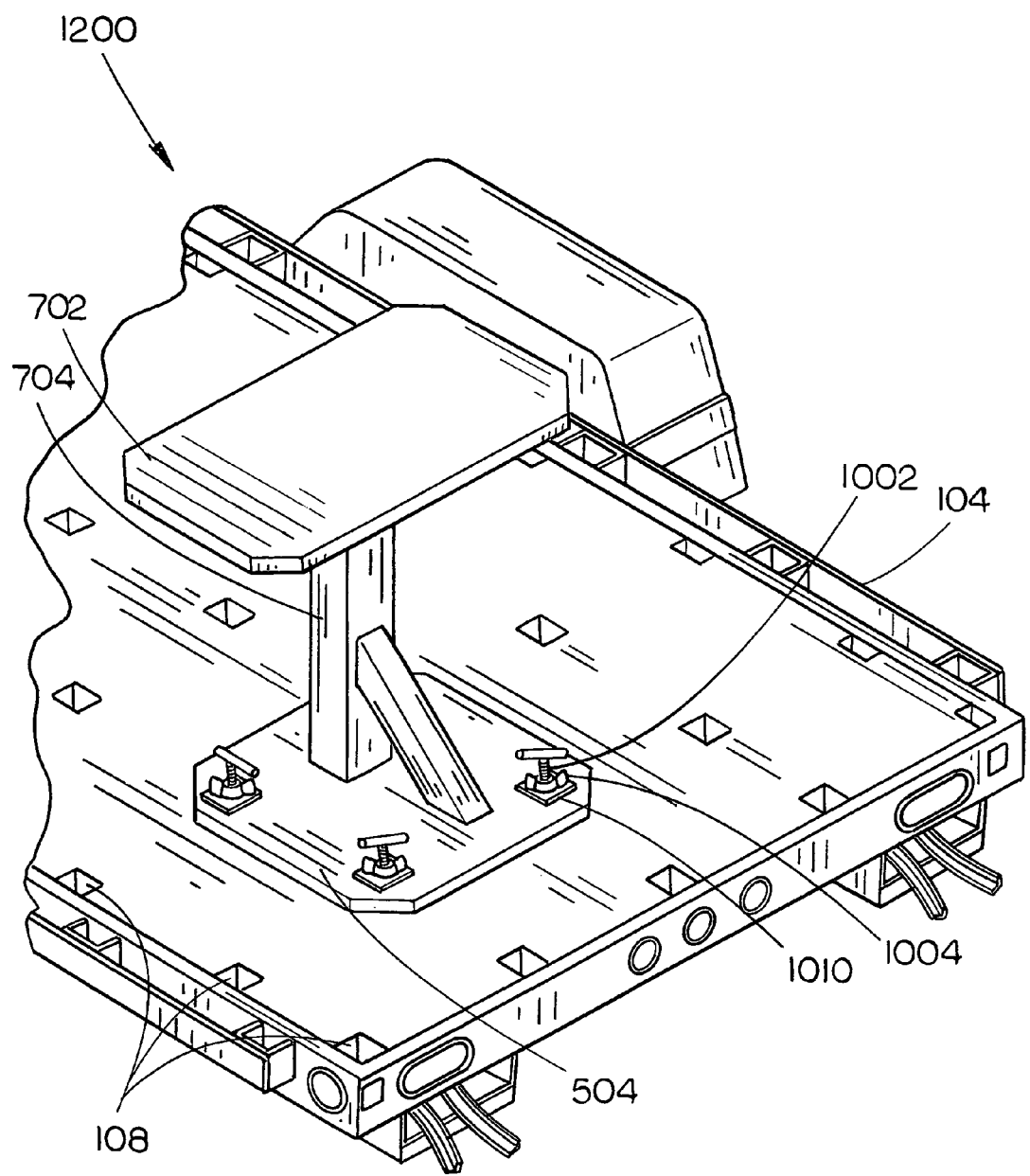
FIG. 12 is an isometric view of an exemplary securing assembly implemented with a load binding apparatus attachment according to the present invention.

Referring to FIGS. 10, 11 and 12, securing assembly may be comprised of an interlocking securing mechanism 1000 suitable for engaging and disengaging with an individual receiving aperture. FIG. 12 is an isometric view of an exemplary securing assembly 1200 implemented with a load binding apparatus attachment according to the present invention. Interlocking securing mechanism 1000 may be configured to secure at least one attachment to the frame assembly 104. In one embodiment, securing mechanism 1000 may be comprised of a bolt 1002, such as a threaded bolt, a nut 1004 such as a threaded nut with flanges, or any such nut that may be tightened or removed without tools suitable for mating with a bolt, an elongated crosspiece 1008, and a cover plate 1010. Elongated crosspiece 1008 may be configured to allow insertion of a portion of the securing mechanism 1000 into a receiving aperture 108 in one direction only. It is contemplated that a receiving aperture 108 may be substantially rectangular, having a greater width than length, or length than width, etc. As a result, crosspiece 1008 may only be inserted in the direction of the substantially longer dimension. A receiving aperture channel 1012 may be configured with a laterally disposed opening 1014 for each respective receiving aperture 108 suitable for allowing rotation and securing of a securing mechanism crosspiece 1008. In one embodiment, opening 1014 may include a grooved portion configured to receive a crosspiece 1008 that has been rotated within the channel. For example, a securing mechanism may be inserted substantially into a receiving aperture 108. Upon insertion, securing mechanism may be rotated to inhibit undesired release of a crosspiece 1008 from a receiving aperture 108. In the present embodiment, securing mechanism 1000 may be rotated substantially ninety-degrees. It is contemplated, however, that securing mechanism 1000 need only be rotated to a position prohibiting crosspiece 1008 from becoming separated from the receiving aperture 108. Following rotation, securing mechanism 1000 may receive upward force to allow the crosspiece 1008 to be received by the grooved portion of the channel opening. Upward force may be supplied manually, electrically or by other like methods for providing substantial force to allow the crosspiece to be received by the grooved portion of the channel. Securing mechanism nut 1004 may then be rotated to secure the mechanism within the receiving aperture. Securing mechanism cover plate 1010 may provide shielding of internal components from weather conditions such as rain, snow, hail and the like, as well as prevent undesired debris from entering a receiving aperture channel. Cover plate 1010 may be comprised substantially of a durable metal such as steel, and may be configured to provide mounting for a plurality of attachments, such as a bunk, winch plate, bumper, tool box, or any item a user desires to securely load for transport, storage or any use contemplated herein or appropriate even though not specifically contemplated. For example, at least one portion of the cover plate 1010 may be elongated or bent at a desired angle for mounting to the side of an item such as a tool box, tackle box or the like.

Figure 3:
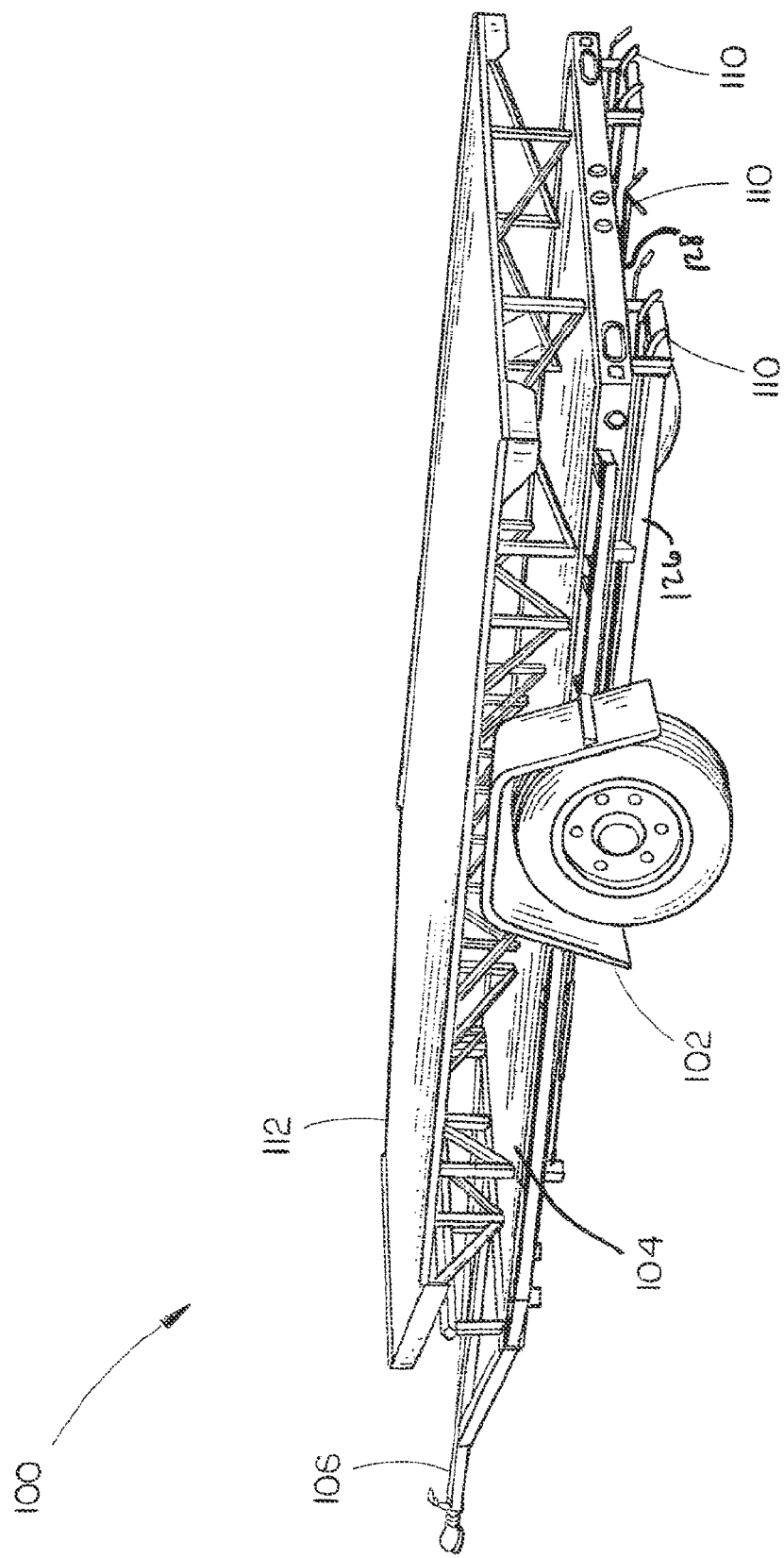
FIG. 3 is an isometric view of the load binding apparatus illustrated in FIG. 1, wherein the load binding apparatus includes a snowmobile deck.

Referring to FIG. 3, an isometric view of the load binding apparatus 100 illustrated in FIG. 1, wherein the load binding apparatus includes a snowmobile deck attachment 112 is shown. Load binding apparatus 100 receivers may be fitted with attachments for supporting a snowmobile deck, as illustrated in FIG. 3. However, the load binding apparatus 100 may be utilized for transporting a plurality of attachments such as an All Terrain Vehicle (ATV), a snowmobile, a personal watercraft, a rock shield for a snowmobile, a spare tire, an animal kennel, a barbecue, a kayak, a canoe, a boat, a golf cart, a cooler, a mower, a tool box, a storage box, a duck blind, a fishing box including a fishing rod, a fishing tackle box, equipment for a ranch, equipment for a farm, a tractor, a loader, equipment for landscaping, tools and/or storage boxes for construction, fire and/or rescue equipment, containers for storing fuel, a deer hoist, an electric winch, equipment for gardening, a generator, an air compressor, a hose reel, equipment for welding, a bike rack, shelving, cabinets, a tent, a ladder rack, a twin-arm removable truck rack, a vehicle, a parts washer, a gas pump, an air tank, a go kart, a sand-rail, a motorcycle, a scooter, a log splitter, a wooden box, a side rail, a smoker, a power washer, a wire reel, and like towable objects, as contemplated by one of skill in the art. The deck may be substantially comprised of a plurality of insert columns configured to fit within an equal number of matable receiving apertures. Insert column may be substantially comprised of a durable metal or metal alloy such as expanded metal, sheet metal or the like, and may engage with securing assembly to provide secure attachment of the deck to frame assembly.

Referring to FIG. 4, an isometric view of a plate assembly 400 for connecting accessories to a load binding apparatus in accordance with an exemplary embodiment is shown. Plate assembly 400 may be comprised of at least one vertical insert column 404 coupled to a horizontal support plate 402. Vertical insert column 404 may be suitable for insertion into at least one load binding apparatus receiving aperture for securing the plate assembly 400 to the frame assembly 104. Vertical insert column 404 may include a plurality of apertures 410 suitable for receiving a securing pin upon insertion of the insert column 404 into a receiving aperture 108. Horizontal support plate 402 may be comprised of a plurality of apertures 406 suitable for receiving a securing device such as a bolt, screw, or like device and may provide mounting of an attachment such as a hull engaging bunk or bumper. In an alternative embodiment, plate assembly 400 may be implemented with securing mechanism 1000. For instance, securing mechanism 1000 may be coupled to the plate assembly 400 through an aperture 408 for securing the plate assembly 400 to the frame assembly 104.

Referring generally to FIG. 5, an isometric view of a bumper attachment 500 for a load binding apparatus 100 in accordance with an exemplary embodiment of the present invention is shown. In one embodiment, bumper attachment 500 may be implemented with plate assembly 400 to provide stable mounting of a bumper attachment 500 to a frame assembly 104. Bumper attachment 500 may be utilized to absorb shock between a watercraft such as boat and the load binding apparatus 100. Bumper attachment 500 may also dock and stabilize a watercraft when the watercraft is loaded onto the load binding apparatus. Bumper attachment may be comprised of at least one vertical column 502 coupled to a horizontal base support plate 504, further including a plurality of horizontal base support plate apertures 510. Vertical column 502 may be suitable for providing support for a watercraft such as boat. Support plate may be suitable for coupling with plate assembly 400 for securing the bumper attachment 500 to the frame assembly 104. Bumper attachment 500 may be implemented with securing mechanism 1000. For instance, securing mechanism 1000 may be coupled substantially to the plate assembly 400 and the plate assembly may be implemented with the securing mechanism 1000 for mounting the of bumper attachment 500 onto the frame assembly 104. In an alternative embodiment, bumper attachment 500 may be implemented with the securing mechanism 1000 directly, and may not require mounting to a plate assembly.

Figure 6:
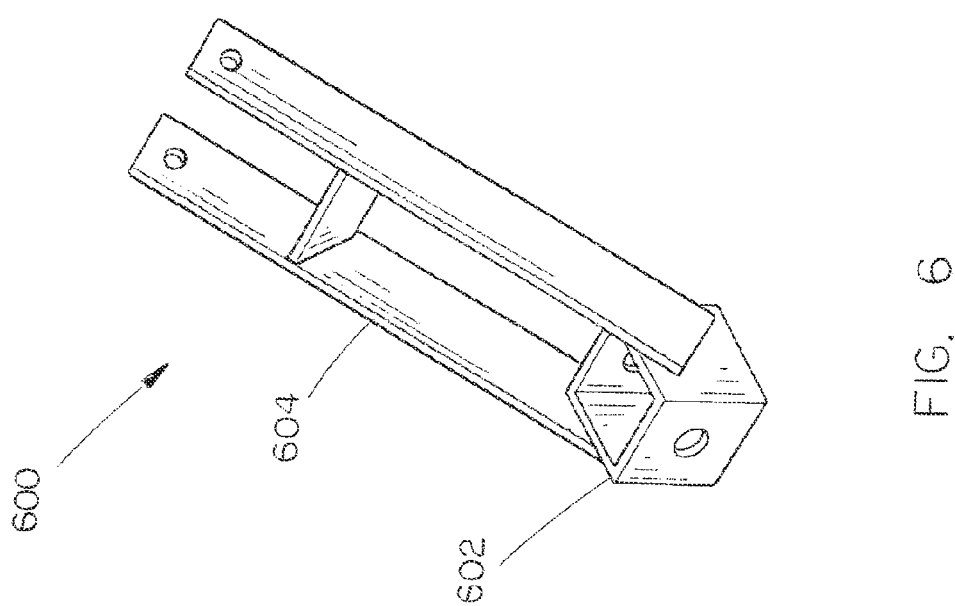
FIG. 6 is an isometric view of an attachment for a load binding apparatus in accordance with an exemplary embodiment of the present invention.

Referring generally to FIG. 6, an isometric view of an attachment 600 for a load binding apparatus in accordance with an exemplary embodiment of the present invention is shown. Attachment 600 may be a multipurpose attachment suitable for attaching to a plurality of towable objects such as winch. Attachment 600 may be securable to a load binding apparatus frame assembly. Attachment 600 may include a support base 602 and a mounting assembly 604 rotatably coupled to the support base 602. Attachment 600 may be implemented with securing mechanism 1000. For instance, support base may be suitable for coupling with plate assembly 400 for securing the attachment 600 to the frame assembly 104. In an alternative embodiment, attachment 600 may be implemented with the securing mechanism 1000 directly, and may not require mounting to a plate assembly.

Figure 7:
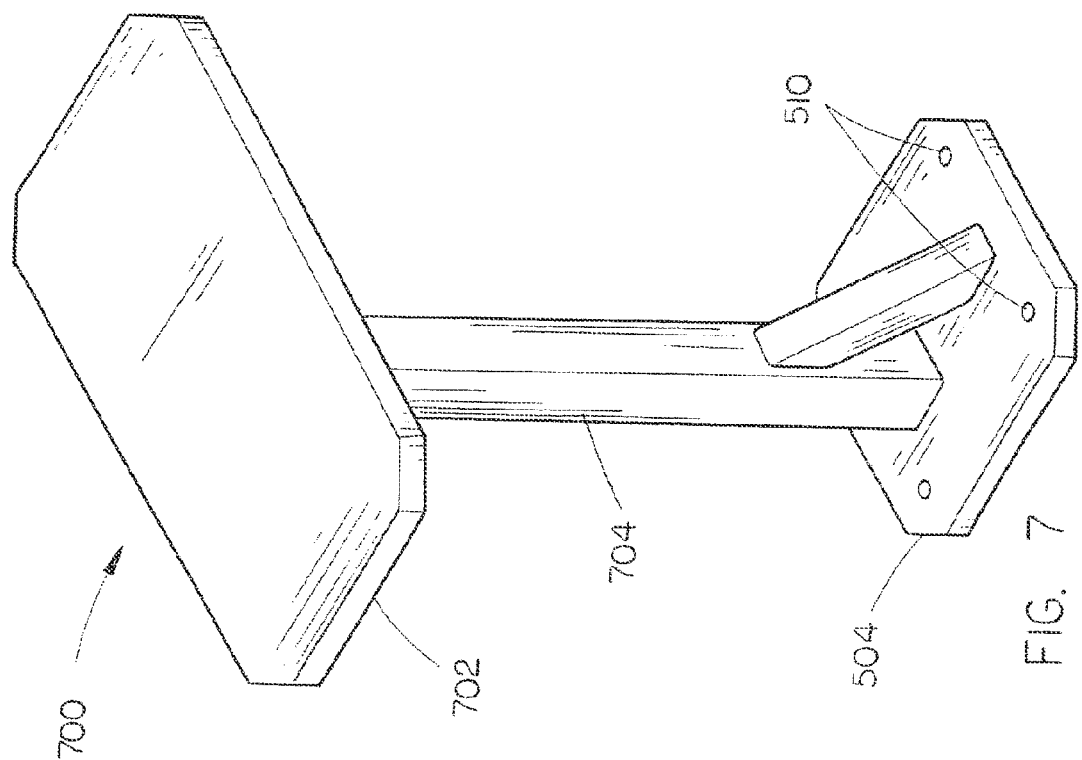
FIG. 7 is an isometric view of a winch plate for a load binding apparatus in accordance with an exemplary embodiment of the present invention.

Referring generally to FIGS. 7 and 12, an isometric view of a winch plate 700 for a load binding apparatus 100 in accordance with an exemplary embodiment of the present invention is shown. Winch plate 700 may be utilized to attach a towing device such as a towing winch to the load binding apparatus 100. Winch may refer to a device that may utilize a crank and cable to assist in launching and retrieving a boat or other such watercraft. Winch may be motorized or require manual winding and unwinding. Winch plate 700 may be securable to a load binding apparatus frame assembly 104. Winch plate 700 may be comprised of at least one vertical support column 704 coupled to a horizontal support base plate 504 substantially similar to the horizontal support plate 504 of FIG. 5. Vertical support column 704 may be coupled to a horizontal mounting plate 702. Winch plate 700 may be suitable for attaching a device suitable for assisting in launching and retrieving a watercraft, including electrically driven, hand operated, pulley operated, and like winching devices. Winch plate 700 may be implemented with securing mechanism 1000 and plate assembly 400. For instance, the securing mechanism 1000 may be coupled to the plate assembly 400, and winch plate 700 may be coupled to the plate assembly for securing the winch plate 700 to the frame assembly 104. In an alternative embodiment, winch plate 700 may be implemented with the securing mechanism 1000 directly, and may not require mounting to a plate assembly, as illustrated in FIG. 12. For instance, the elongated cross-piece 1008 of the securing mechanism 1000 may be inserted through at least one aperture 510 of the horizontal support plate 504 and through the receiving aperture 108 of the frame assembly. As described above, the crosspiece 1008 may only be inserted in the direction of the substantially longer dimension of both the support plate aperture 510 and the receiving aperture 108. Upon insertion, securing mechanism may be rotated to inhibit undesired release of a crosspiece 1008 from a receiving aperture 108.

Figure 8:
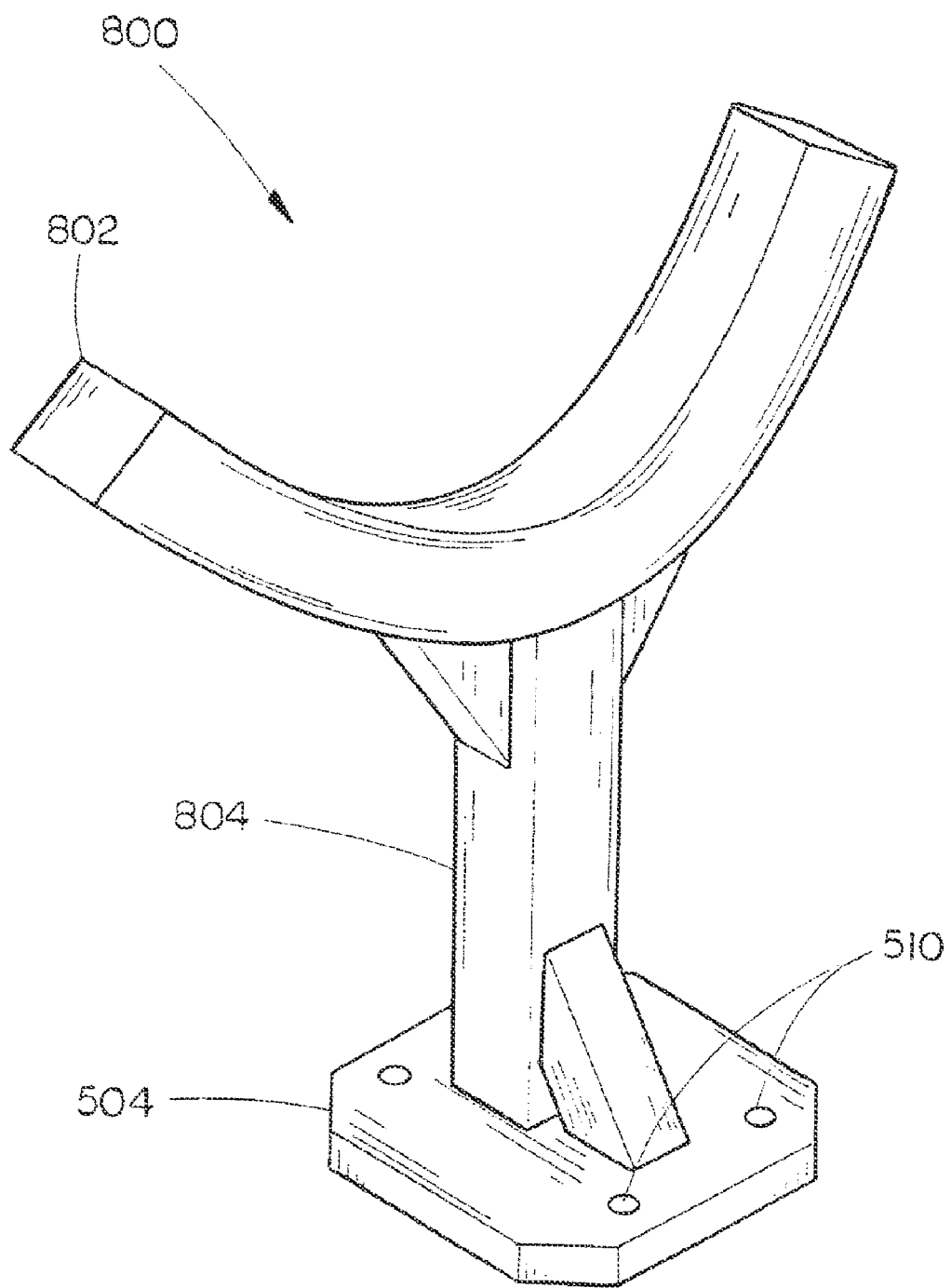
FIG. 8 is an isometric view of a personal watercraft bunk for a load binding apparatus in accordance with an exemplary embodiment of the present invention.

Referring generally to FIG. 8, an isometric view of a hull-engaging bunk assembly 800 such as personal watercraft bunk for a load binding apparatus in accordance with an exemplary embodiment of the present invention is shown. Bunk 800 may be configured to engagingly support the bottom sides of a watercraft hull placed thereon during transportation and storage. Bunk 800 may further include a vertical support column 804, a horizontal base support plate 504, and a plurality of horizontal base support plate apertures 510. Load binding apparatus bunk attachment may further include a two bunk adjustable boat support configured to be utilized with most common v-hull, semi-v-hull, flat bottom boats, and like watercraft. Bunk may be further comprised of an adjustable bow top 802 suitable for accommodating a variety of boat length and weight distribution requirements.

Figure 9:
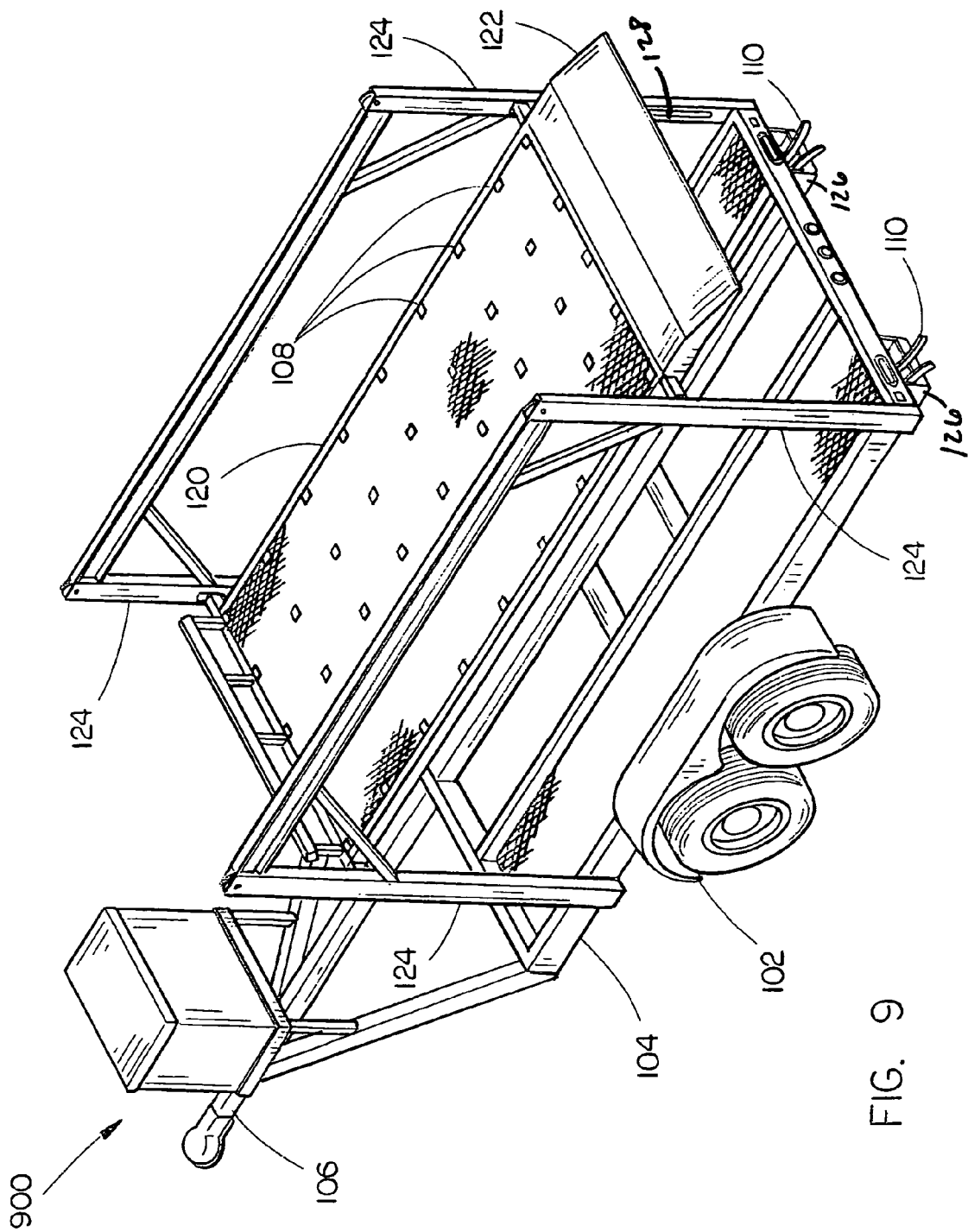
FIG. 9 is an isometric view of a load binding apparatus having multiple frame assemblies in accordance with an exemplary embodiment of the present invention.

Referring to FIG. 9, an isometric view of a multiple frame assembly system 900 having multiple frame assemblies in accordance with an exemplary embodiment of the present invention is shown. It is contemplated that load binding system and apparatus may be implemented with two or more frame assemblies, one located substantially above another. Multiple frame assemblies 104, 120 may be hydraulically coupled to provide convenient and efficient raising and lowering of a top frame assembly. Each frame assembly of a multiple frame assembly system 900 may include a plurality of receiving apertures 108 disposed on the frame assembly surface. Receiving apertures 108 may be disposed in any desired configuration, and may be different for each individual frame assembly. In one embodiment, load binding apparatus may include two frame assemblies. The upper frame assembly 120 may be loaded in a lowered position. To accomplish lowering of upper frame assembly, an upper frame assembly 120 may include a concealed hydraulic lowering system 130 that raises and lowers the upper frame assembly. Lowered upper frame assembly may be recessed into the lower frame assembly for loading. Subsequent to loading, upper frame assembly may be hydraulically raised to a desired traveling position and supported by a support assembly 124. The lower frame assembly may then be loaded, and a fender portion of the load binding apparatus may be raised, allowing access to a driver's side door, if necessary. Both the upper and lower frame assemblies may include torsion axles having brakes on all wheels. A boat or several personal water craft may then be floated onto either frame assembly as desired. With an optional insert 122, a small car, golf cart or several ATV's may be driven onto it. It is contemplated that the lower deck may accommodate a large vehicle as large as a full-size sport utility vehicle, truck, or the like. Further, with another optional insert, load binding apparatus may support an additional boat or ATV.

Load binding apparatus 100 may be implemented with a suspension assembly suitable for providing suspension for the load binding apparatus. In one embodiment, suspension may be completely self-contained within an axle tube. Suspension may attach directly to the load binding apparatus frame utilizing brackets which may be an integral part of the axle assembly. The suspension assembly axle may provide improved suspension characteristics relative to leaf spring axles through the unique arrangement of a steel torsion bar surrounded by four natural rubber cords encased in the main structural member of the axle beam. Additionally, a wheel/hub spindle may be attached to a lever, generally referred to as a torsion arm, which may be fastened to the rubber encased bar. As load is applied, the bar may rotate, causing a rolling/compressive resistance in the rubber cords. This action may provide the same functionality as conventional sprung axles. However, suspension assembly may also provide a plurality of operating advantages, including independent suspension.

Load binding apparatus may be further comprised of an electric braking system, including electric brake mechanisms for at least one axle, a loading ramp, and a load binding apparatus fender pivotally coupled substantially to a rear portion or a lateral portion of the load binding apparatus. Load binding apparatus fender coupled laterally to the load binding apparatus may provide convenient access to a towed automobile driver's side door. Load binding apparatus surface may be coated with a protective paint coating or an aluminum gravel guard suitable for minimizing or substantially reducing body damage or paint chipping from the load binding apparatus surface. Load binding apparatus may also be undercoated in desired portions of the apparatus, such as the fender. A load binding apparatus having multiple frame assemblies may include a warning alarm mechanism for providing a warning when an upper frame assembly is raised or lowered. Other components that may be included in load binding apparatus may be a rear jack stand suitable for reducing stress on the load binding apparatus frame assembly, especially during loading or unloading. Additionally, a wide angle camera may be mounted substantially on the rear of the load binding apparatus to provide increased viewing area for a driver.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof.

What is claimed is:

1. A load binding apparatus comprising:

a frame assembly further including a plurality of receiving apertures having a length and a width, the length being greater than the width;

an interlocking securing mechanism for engaging and disengaging with a receiving aperture of the plurality of apertures, the interlocking securing mechanism further including:
a securing device; and
an elongated crosspiece having a length greater than the width of the receiving aperture coupled substantially perpendicularly to the securing device; and
at least one receiving aperture channel coupled to the underside of the frame assembly, the at least one receiving aperture channel further including a laterally disposed opening allowing rotation of the elongated crosspiece and further including a substantially centrally located raised portion for receiving the elongated crosspiece upon rotation and securing of the securing device to the channel.

2. The load binding apparatus of claim 1, wherein the load binding apparatus further comprises a mounting plate assembly suitable for mounting an attachment onto the frame assembly.

3. The load binding apparatus of claim 1, further comprising a lever assembly suitable for providing releasable coupling of the attachment to the frame assembly by engaging and disengaging at least with a vertical column of an the attachment.

4. The load binding apparatus of claim 3, wherein the lever assembly includes at least one securing rod.

5. The load binding apparatus of claim 4, wherein the at least one securing pin engages and disengages with an aperture of the vertical column of the attachment.

6. The load binding apparatus of claim 1, further comprising a second supporting frame assembly coupled to the load binding apparatus and positioned substantially above the frame assembly.

7. The load binding apparatus of claim 1, wherein the securing device is a threaded bolt.

8. The load binding apparatus of claim 7, wherein the securing device further includes a nut configured to engage with the bolt to secure the cover plate to the receiving aperture.

9. A towing system, said system comprising:
a wheel axle frame assembly supporting at least one wheel axle provided with wheels; and
a load binding assembly, further comprising:
a supporting frame assembly coupled to the wheel axle frame, the supporting frame assembly further comprising at least one towing hook coupling arranged for cooperation with a towing hook and a plurality of receiving apertures having a length and a width, the length being greater than the width;
an interlocking securing mechanism for engaging and disengaging with a receiving aperture of the plurality of apertures, the interlocking securing mechanism further including:
a securing device;
an elongated crosspiece having a length greater than the width of the receiving aperture coupled substantially perpendicularly to the securing device; and
at least one receiving aperture channel coupled to the underside of the frame assembly, the at least one receiving aperture channel further including a laterally disposed opening allowing rotation of the elongated crosspiece and further including a raised portion for receiving the elongated crosspiece upon rotation and securing of the securing device to the channel.

10. The towing system of claim 9, further comprising an attachment including a horizontal support plate further including a plurality of apertures suitable for coupling the attachment to the supporting frame assembly via the interlocking securing mechanism.

11. The towing system of claim 9, wherein the load binding assembly further comprises a mounting plate assembly suitable for mounting an attachment onto the frame assembly.

12. The towing system of claim 9, further comprising a lever assembly suitable for providing releasable coupling of the attachment to the frame assembly by engaging and disengaging at least with a vertical column of the attachment.

13. The towing system of claim 9, further comprising a second supporting frame assembly coupled to the load binding apparatus.

14. The towing system of claim 13, wherein the lever assembly includes at least one securing rod.

15. The towing system of claim 14, wherein the at least one securing pin engages and disengages with an aperture of the vertical column of the attachment.

* * * * *